United States Patent
Ko et al.

(10) Patent No.: US 12,502,560 B2
(45) Date of Patent: Dec. 23, 2025

(54) CARTRIDGE FOR HIGH INTENSITY FOCUSED ULTRASOUND GENERATOR APPARATUS AND APPARATUS INCLUDING THE SAME

(71) Applicant: LUTRONIC CORPORATION, Goyang-si (KR)

(72) Inventors: Kwangchon Ko, Goyang-si (KR); Jae Won Choi, Seoul (KR); Sang Hyun Lee, Goyang-si (KR)

(73) Assignee: LUTRONIC CORPORATION, Goyang-si (KR)

( * ) Notice: Subject to any disclaimer, the term of this patent is extended or adjusted under 35 U.S.C. 154(b) by 0 days.

(21) Appl. No.: 18/641,754

(22) Filed: Apr. 22, 2024

(65) Prior Publication Data
US 2024/0366968 A1 Nov. 7, 2024

(30) Foreign Application Priority Data
May 2, 2023 (KR) .................. 10-2023-0056943

(51) Int. Cl.
*A61N 7/02* (2006.01)
*A61N 7/00* (2006.01)

(52) U.S. Cl.
CPC ........ *A61N 7/02* (2013.01); *A61N 2007/0034* (2013.01); *A61N 2007/0078* (2013.01)

(58) Field of Classification Search
CPC ............. A61N 7/02; A61N 2007/0034; A61N 2007/0078; A61N 2007/0065; A61N 2007/0091
See application file for complete search history.

(56) References Cited

U.S. PATENT DOCUMENTS

| | | | | |
|---|---|---|---|---|
| 3,784,805 A | * | 1/1974 | Rolle | G01S 7/003 367/111 |
| 4,424,813 A | * | 1/1984 | Havlice | G10K 11/355 73/620 |
| 4,785,819 A | * | 11/1988 | Pearce | G10K 11/355 600/446 |
| 4,807,634 A | * | 2/1989 | Enjoji | G10K 11/355 600/437 |
| D304,760 S | * | 11/1989 | Curtis | D24/141 |
| 4,895,158 A | * | 1/1990 | Kawabuchi | G01S 7/52079 600/463 |
| 5,372,138 A | * | 12/1994 | Crowley | A61B 18/1492 600/463 |
| 8,167,803 B2 | * | 5/2012 | McMorrow | A61B 8/4455 600/443 |

(Continued)

FOREIGN PATENT DOCUMENTS

| | | |
|---|---|---|
| JP | 2014-147819 A | 8/2014 |
| KR | 10-2010-0120188 A | 11/2010 |

(Continued)

*Primary Examiner* — Bo Joseph Peng

(57) ABSTRACT

The present invention relates to a cartridge that can fundamentally prevent twisting of wires when a transducer rotates infinitely, and a focused ultrasound generator including the same. According to the present disclosure, the transducer can be rotated infinitely, so a wide range of treatments can be effectively performed. Additionally, according to the present disclosure, a focused ultrasound generator capable of performing auxiliary input using a touch screen may be provided.

10 Claims, 23 Drawing Sheets

(56) References Cited

U.S. PATENT DOCUMENTS

| | | | | |
|---|---|---|---|---|
| 8,409,102 | B2* | 4/2013 | Griffin | A61B 8/4461 600/407 |
| 11,576,650 | B2* | 2/2023 | Saberi | A61B 8/4455 |
| 2001/0031922 | A1* | 10/2001 | Weng | A61B 8/4461 601/3 |
| 2002/0042574 | A1* | 4/2002 | Manor | A61B 8/4461 600/454 |
| 2009/0171252 | A1* | 7/2009 | Bockenstedt | G10K 11/352 601/2 |
| 2009/0240146 | A1* | 9/2009 | Bockenstedt | A61N 7/02 600/459 |
| 2014/0046186 | A1* | 2/2014 | Mauldin, Jr. | A61B 8/4254 600/443 |
| 2014/0107488 | A1* | 4/2014 | Fearnot | A61B 8/4461 600/462 |
| 2014/0107489 | A1* | 4/2014 | Fearnot | G01S 15/894 600/463 |
| 2017/0303895 | A1* | 10/2017 | Park | A61N 7/02 |
| 2018/0303515 | A1* | 10/2018 | Shadduck | A61B 17/320068 |
| 2019/0366129 | A1* | 12/2019 | Park | A61N 7/02 |
| 2023/0008673 | A1* | 1/2023 | Park | A61N 7/02 |
| 2024/0350163 | A1* | 10/2024 | Li | A61B 17/320092 |

FOREIGN PATENT DOCUMENTS

| | | |
|---|---|---|
| KR | 10-2016-0005631 A | 1/2016 |
| KR | 10-1649899 B1 | 8/2016 |
| KR | 10-1687569 B1 | 12/2016 |
| KR | 10-2017-0065424 A | 6/2017 |
| KR | 10-2020-0090053 A | 7/2020 |
| KR | 10-2021-0023800 A | 3/2021 |
| KR | 10-2021-0076820 A | 6/2021 |
| KR | 10-2400885 B1 | 5/2022 |

\* cited by examiner

CARTRIDGE FOR HIGH INTENSITY FOCUSED ULTRASOUND GENERATOR APPARATUS AND APPARATUS INCLUDING THE SAME

CROSS-REFERENCE TO RELATED APPLICATIONS

Priority to Korean patent application number 10-2023-0056943 filed on May 2, 2023 the entire disclosure of which is incorporated by reference herein, is claimed

TECHNICAL FIELD

The present disclosure relates to a cartridge for a focused ultrasound generator capable of treating skin and a focused ultrasound generation apparatus including the same.

BACKGROUND

Tissue treatment using focused ultrasound (High intensity focused ultrasound) has been mainly used to treat cancer cells, but recently, a technology to regenerate tissue by irradiating the skin has been developed and used.

Conventional skin treatment devices using focused ultrasound operate by exposing the transducer to a liquid environment and transmitting energy to one focus to increase transmission efficiency when transmitted through a medium due to the nature of ultrasound.

However, these conventional focused ultrasound treatment devices have the problem of increasing treatment time and increasing patient discomfort because the user must repeatedly move the handpiece to treat various depths and large areas.

SUMMARY

The purpose of the present disclosure is to provide the high intensity focused ultrasound generator device capable of moving the focal position of ultrasound three-dimensionally to solve the problems of conventional focused ultrasound devices.

Furthermore, the purpose is to provide a focused ultrasound generator device capable of performing auxiliary input when a user holds the handpiece in a posture where it is difficult to operate the trigger during the use of the focused ultrasound device.

To solve the aforementioned problem, according to an embodiment of the disclosure a cartridge for high intensity focused ultrasound generator apparatus may be provided, the cartridge comprising: a cartridge housing defining an internal space configured with an upper portion to be detachably coupled with a handpiece and a lower portion with an acoustic window for transmitting ultrasound waves, a frame configured to divide the internal space into an upper space and a lower space, a shaft penetrating the upper portion of the cartridge housing and the frame in a vertical direction and configured to be rotatable, at least one transducer provided in the lower space and configured to rotate together with the shaft and a rotating electrical connector configured to maintain electrical connection when the at least one transducer rotates.

Meanwhile the rotating electrical connector may be provided in the upper space.

Furthermore the frame and the shaft may be sealed to prevent fluid contained in the lower space from leaking into the upper space.

Moreover the shaft may comprise a channel formed along the longitudinal direction at least partially on the inside, an upper hole opened from the channel into the upper space, and a lower hole opened from the channel into the lower space and wiring disposed through the upper hole, the channel, and the lower hole, and one side of the wiring may be connected to the rotary electrical connector and the other side of the wiring is connected to the transducer.

Meanwhile the upper hole and the lower hole may be each sealed with the wiring disposed.

Furthermore the rotating electrical connector may comprise a first disk extending radially within the upper space, a plurality of ring-shaped conductors configured concentrically on the first disk and a plurality of contact portions configured to respectively contact the plurality of ring-shaped conductors.

Meanwhile the rotary electrical connector may comprise a second disk fixed to the frame, and each of the plurality of contact portions is extended a predetermined length in the downward direction, and is provided at least two points at different distances from the center of the second disk.

Meanwhile the cartridge may further comprise a housing cap coupled to the upper portion of the cartridge housing, and an upper end of the contact portion penetrates the housing cap and protrudes above the housing cap.

In addition a cartridge may be provided, the cartridge may comprises housing defining an internal space configured with an upper portion to be detachably coupled with a handpiece and a lower portion with an acoustic window for transmitting ultrasound waves, a frame configured to divide the internal space into an upper space and a lower space, a shaft penetrating the upper portion of the cartridge housing and the frame in a vertical direction and configured to be rotatable, at least one transducer provided in the lower space and configured to rotate together with the shaft and a rotating electrical connector configured to maintain electrical connection when the at least one transducer rotates, and at least one transducer is configured to generate a focal point at a predetermined point in a radial direction from a rotation center of the shaft.

Meanwhile, as the shaft rotates, the focal point generated from at least one transducer can move along a circle.

Meanwhile the transducers may be configured in plural, and may be configured to generate each focal point with a different radius of rotation.

Meanwhile the focal point with deeper tissue penetration depth may follow a larger circular path compared to the focal point with shallower tissue penetration depth.

Further each of the focal points of the plurality of transducers may have different distances from the bottom of the acoustic window.

Further at least one transducer may be tilted with respect to the shaft.

Meanwhile at least one transducer may be configured to operate independently.

In addition a high intensity focused ultrasound generator apparatus may be provided, the high intensity focused ultrasound generator apparatus comprising a handpiece configured to be held by a user and equipped with a trigger and a touch screen for operation, a control unit that controls the operation of the at least one transducer based on the trigger and input generated from the touch screen and a cartridge configured to be coupled to an end of the handpiece, and the cartridge is configured to comprise a rotating electrical connector configured to remain electrically connected when at least one transducer rotates, and the control unit is configured to distinguish between short touch and long touch inputs received from the touch screen, and configured to control the transducer in the same manner as input from the trigger when the long touch is input.

Meanwhile the trigger may be provided on one side of the handpiece, and the touch screen is provided on a side of the handpiece opposite to the trigger.

Further the transducer may be provided in plural, with each focal point of the ultrasound waves being arranged to move along circles with different radius of circle.

Meanwhile at least one of the plurality of transducers may be configured to have a different distance of focal point from the bottom of the cartridge than the other transducers.

Meanwhile at least one of the plurality of transducers may be provided at a predetermined angle with the other transducers.

Meanwhile the control unit may be configured to selectively operate at least one transducer to adjust the radius and/or depth of the focal point according to the input by user.

The cartridge for the high-intensity focused ultrasound generator apparatus and the focused ultrasound generator apparatus comprising that according to the present disclosure, can ensure stability as the twisting of wiring during the rotation of ultrasound transducers is fundamentally prevented.

Moreover, according to this disclosure, it is possible to effectively treat a wide range by dynamically moving the focal point of ultrasound in three dimensions.

Additionally, with this disclosure, when operating triggers become difficult to manipulate due to the handpiece's gripping method, operation signals can be generated using a touch screen, thereby enhancing user convenience.

DETAILED DESCRIPTION

Figure 1:
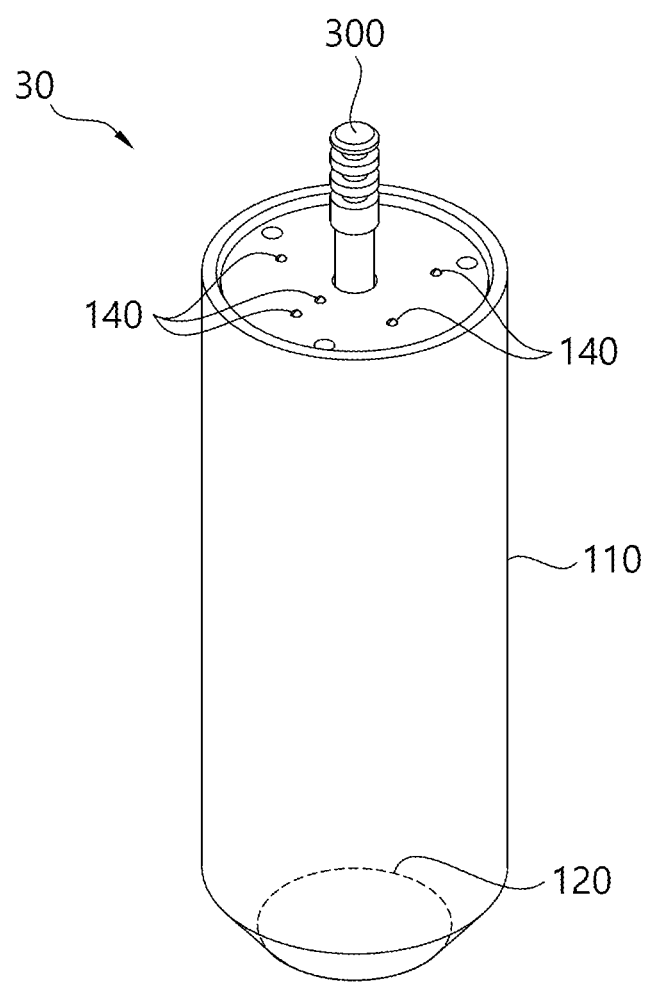
FIG. 1 is a sectional view of a cartridge for the high intensity focused ultrasound generator apparatus according to the first embodiment of the present invention.

Hereinafter, cartridge for high intensity focused ultrasound generator apparatus and apparatus including the same according to embodiments of the present disclosure will be described in detail with reference to the attached drawings. In the description of the following embodiments, the name of each component may be referred to as different names in the art. However, if there is functional similarity and identity between components, they can be regarded as equivalent components even if modified embodiments are adopted. Additionally, a symbol is attached to each component for convenience of description. However, content shown in the drawings in which such symbols are written does not limit each component to the scope within the drawings. Likewise, even if an embodiment in which a configuration in a drawing is partially modified is adopted, it can be regarded as an equivalent configuration if there is functional similarity and identity. Further, if a component is recognized as a component that should be included in light of the general level of technicians in the relevant technical field, the description thereof will be omitted.

Figure 2:
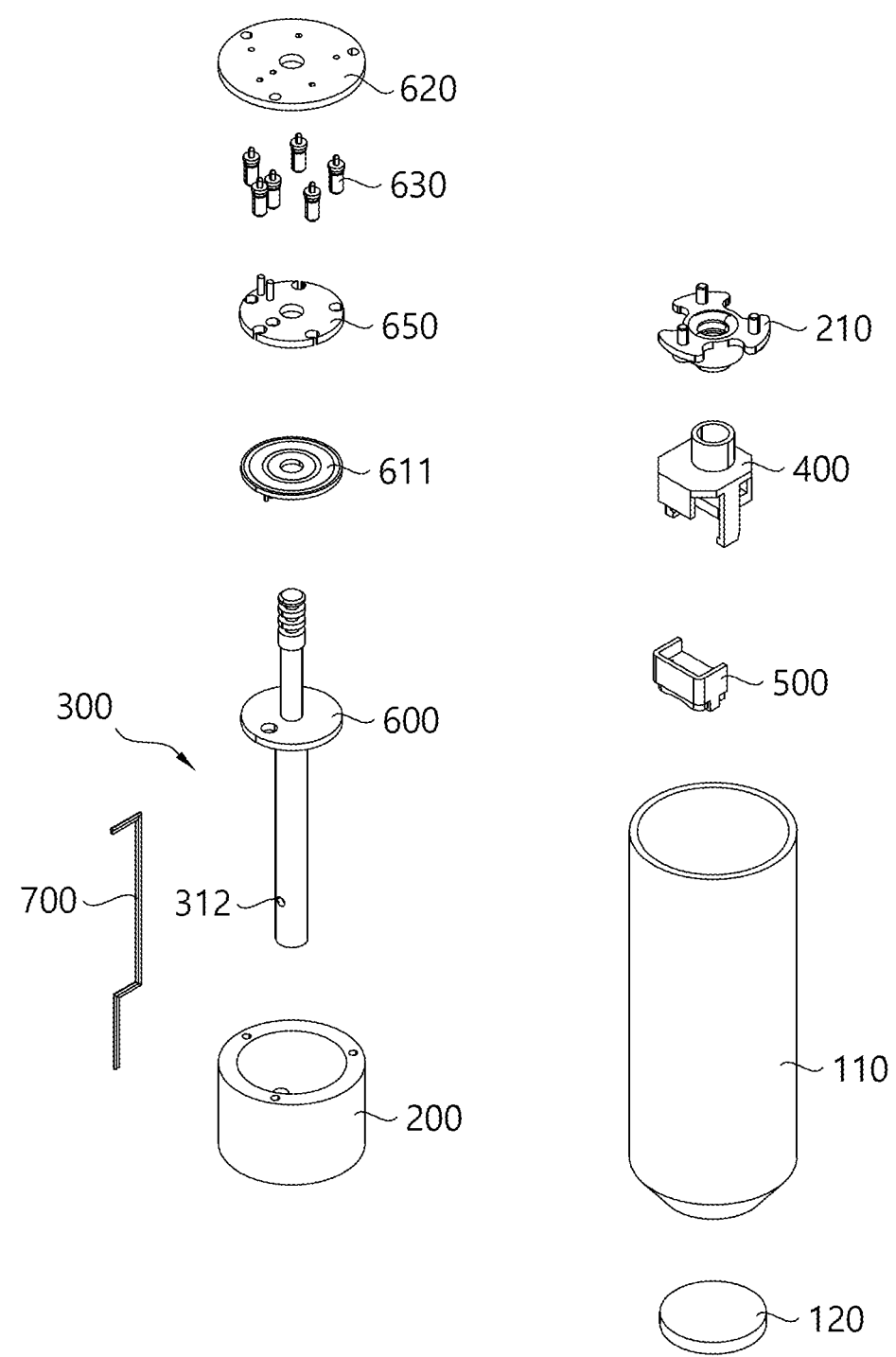
FIG. 2 is an exploded sectional view of a cartridge for the high intensity focused ultrasound generator apparatus according to the first embodiment of the present invention.
Figure 3:
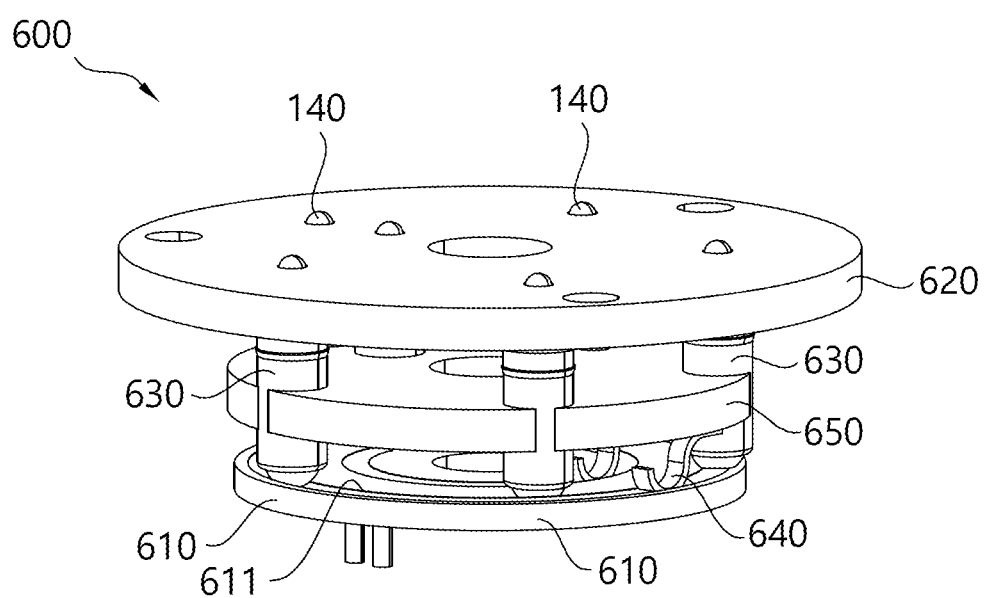
FIG. 3 is an enlarged partial sectional view showing a rotary electrical connector according to the first embodiment of the present invention.

FIG. 1 is a sectional view of a cartridge for the high intensity focused ultrasound generator apparatus according to the first embodiment of the present invention, FIG. 2 is an exploded sectional view of a cartridge for the high intensity focused ultrasound generator apparatus according to the first embodiment of the present invention, and FIG. 3 is an enlarged partial sectional view showing a rotary electrical connector according to the first embodiment of the present invention.

Referring to FIGS. 1 to 3, the cartridge 30 for a focused ultrasound generator according to the first embodiment of the present invention comprises one end connectable to a handpiece, and at least one transducer 500 may be configured to rotate when power is transmitted from the handpiece. Additionally, when the cartridge 30 is connected to the handpiece, at least one transducer 500 may be configured to focus ultrasound waves outside the cartridge 30 by receiving power from the handpiece.

The cartridge 30 according to the first embodiment of the present invention includes a cartridge 30 housing 110, a frame 200, a shaft 300, a sealing unit 210, a transducer 500, and a rotating electrical connector 600.

Inside the housing 110 of the cartridge 30, an internal space may be defined where the transducer 500 can be provided and rotated. In FIG. 2, the upper portion of the housing 110 of the cartridge 30 may be configured to be detachable from the handpiece. An acoustic window 120 through which ultrasound waves pass may be provided at the lower portion of the housing 110 of the cartridge 30. The housing 110 of the cartridge 30 may be may be formed to extend a predetermined length in the vertical direction.

Figure 5A:
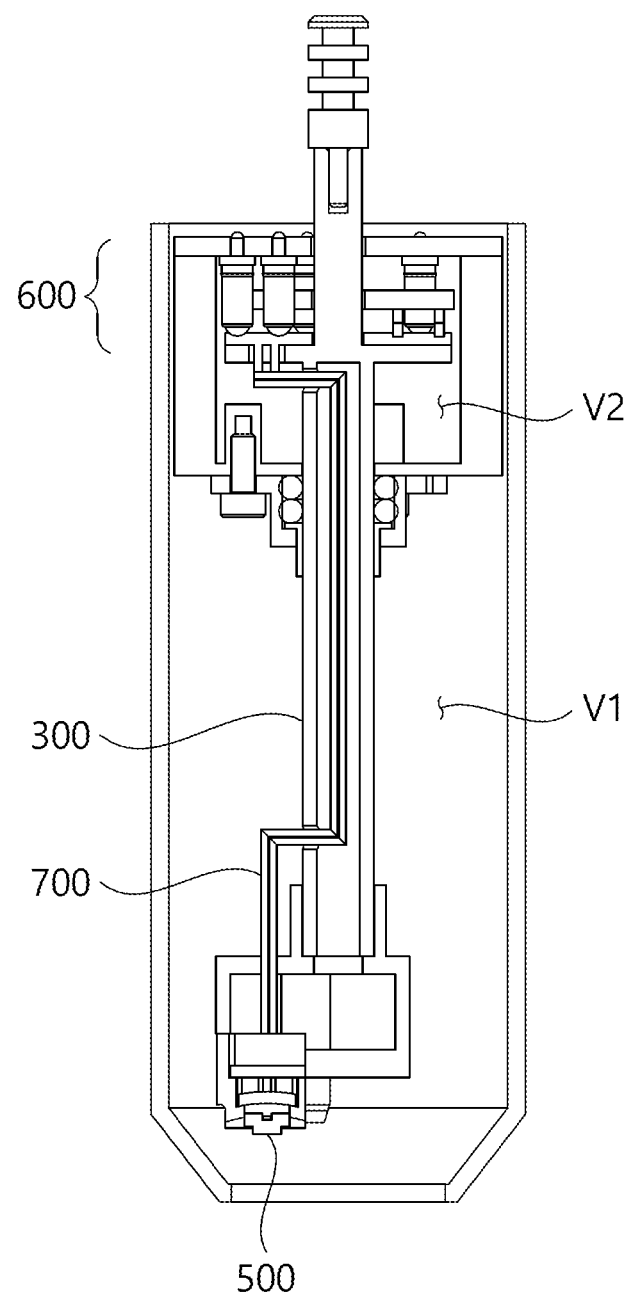
FIGS. 5*a* and 5*b* are operational views of a cartridge for the high intensity focused ultrasound generator apparatus according to the first embodiment of the present invention.

The frame 200 is provided within the housing 110 of the cartridge 30 and is configured to divide the internal space inside the housing 110 of the cartridge 30 into an upper space (V1, see FIG. 5a) and a lower space (V2, see FIG. 5a). Fluid may be accommodated in the lower space to increase the focusing efficiency of ultrasound waves when using the transducer.

The shaft 300 is formed to extend in the vertical direction and may be provided to penetrate the frame 200. The upper end of the shaft 300 penetrates the second disk 620, which will be described later, and the lower end may be positioned in the lower space within the housing 110 of the cartridge 30. The upper end of the shaft 300 may be equipped with a gear so that it can rotate by receiving rotational force from a driving unit of a handpiece, for example, a motor. The wiring 700 may be disposed at least a portion of the shaft. A channel is formed inside the shaft, and the channel may be connected to the upper hole and the lower hole 312, respectively.

The sealing unit 210 is provided at the lower portion of the frame 200, into which the shaft 300 may be inserted. The sealing unit 210 may be configured to prevent fluid contained in the lower space from leaking into the upper space when the inserted shaft 300 rotates. The sealing unit 210 may be configured as a conventional component, for example, O-ring.

The transducer holder 400 is provided at the lower portion of the shaft 300 and may be configured to fix at least one transducer 500, which will be described later. The transducer holder 400 rotates together with the shaft 300, and the transducer 500 coupled to the transducer holder 400 may also rotate together. The transducer 500 holder 400 may be configured to generate at least one focus of ultrasound waves at a point located a predetermined distance from the rotational center axis of the shaft 300. Accordingly, the focus of ultrasound waves generated from at least one transducer 500 by rotation of the shaft 300 may move along a circular path.

The transducer 500 generates ultrasound waves in a downward direction and may be configured to focus the ultrasound waves on the outside of the cartridge 30 through the acoustic window 120. Since the ultrasound transducer 500 can be configured with a widely used conventional configuration, further detailed description of the configuration will be omitted.

Referring to FIG. 3, the rotating electrical connector 600 is configured to maintain electrical contact even if the shaft 300 rotates infinitely within the cartridge 30. As an example, the rotating electrical connector 600 may be provided inside the frame 200, that is, in the upper space. The rotary electrical connector 600 may include a first disk 610, a second disk 620, a ring-shaped conductor 611, a contact portion 630, an elastic part 640 and spacer 650

The first disk 610 may be coupled to the shaft 300 within the upper space. The first disk 610 may be configured to rotate together with the shaft 300. As an example, the first disk 610 may be provided with a plurality of ring-shaped conductors 611 that are concentric and have different diameters on the upper surface of the first disk 610.

The second disk 620 may be coupled to and fixed to the frame 200. Each contact portion 630 may be configured to maintain electrical contact while sliding on the ring-shaped conductor 611. Each contact portion 630 may be formed to extend a predetermined length in the vertical direction. The lower end of each contact portion 630 may be configured to contact with the upper surface of one of the ring-shaped conductors 611, and may be provided to penetrate the spacer 650 in the vertical direction, and the upper end may penetrate the second disk 620. That is, the upper ends of the plurality of contact portions 630 may be configured to be exposed to the outside at the top of the cartridge 30. The top of each contact portion 630 may function as a connector 140 that is contacted when the cartridge 30 is fastened to the handpiece. Meanwhile, it is also possible to implement a configuration wherein the rotary electrical connector is adapted to be provided on the outer surface of the cartridge.

At this time, a plurality of contact portions 630 may be provided to ensure contact with one ring-shaped conductor 611 to maintain a stable electrical connection.

As an example, each contact portion 630 may be composed of a pogo-pin. Pogo pins are configured to maintain electrical connection even if the distance between the top and bottom varies. The pogo pin is provided with a spring inside, and is configured so that the overall length can vary within a predetermined range by external force.

The spacer 650 is configured to fix the horizontal positions of the plurality of contact portions 630. The spacer 650 may be provided between the first disk 610 and the second disk 620. The spacer 650 is generally shaped like a disk, and a hole is formed in the center to allow the shaft 300 to pass through, and a plurality of holes may be formed in the peripheral portion to allow the contact portion 630 to pass through.

The elastic part 640 is configured to maintain an appropriate distance between the second disk 620 and the first disk 610. One side of the elastic part 640 may be coupled to the lower surface of the spacer 650, and the other side may be configured to press the upper surface of the first disk 610.

As described above, the shaft 300 can receive rotational force from the actuator of the handpiece, and can also be configured to adjust its position by a predetermined distance in the vertical direction. At this time, the sealing unit 210 can prevent the liquid in the lower space from leaking into the upper space even when the shaft 300 moves and rotates in the vertical direction. Additionally, the rotary electrical connector 600 can maintain electrical connection even if the gap between the first disk 610 and the second disk 620 changes when the shaft 300 is adjusted in the vertical direction.

Figure 4:
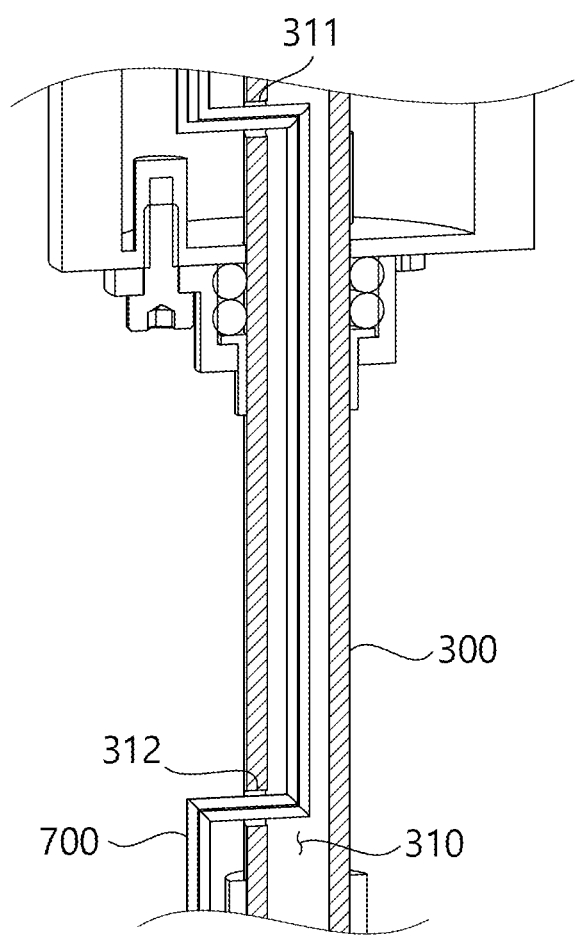
FIG. 4 is a sectional view showing a part of the shaft in the first embodiment of the present invention.

FIG. 4 is a sectional view showing a part of the shaft in the first embodiment of the present invention.

Referring to FIG. 4, the shaft 300 may include a channel 310 formed in at least part of the vertical direction. A wiring 700 may be provided in the channel 310. The upper end of the wiring 700 may be electrically connected to the ring-shaped conductor 611 of the first disk 610, and the lower end of the wiring 700 may be electrically connected to the transducer. When a plurality of transducers are provided, a plurality of wires 700 may be connected to each transducer in order to independently drive each transducer. The shaft 300 may include an upper hole 311 and a lower hole 312. The upper hole 311 may be formed in the radial direction of the shaft 300 on the upper side of the channel 310, and the lower hole 312 may be formed in the radial direction of the shaft 300 on the lower side of the channel 310. The upper hole 311 may be located inside the frame, that is, in the upper space, when the shaft 300 is installed in the cartridge. The lower hole 312 may be located in the lower space when the shaft 300 is installed within the cartridge.

The above-described wiring 700 may be disposed through the upper hole 311, the channel 310, and the lower hole 312. The upper hole 311 and lower hole 312 where the wiring 700 is disposed may be sealed. Therefore, the lower space can be maintained in a sealed state when liquid is contained.

Figure 5B:
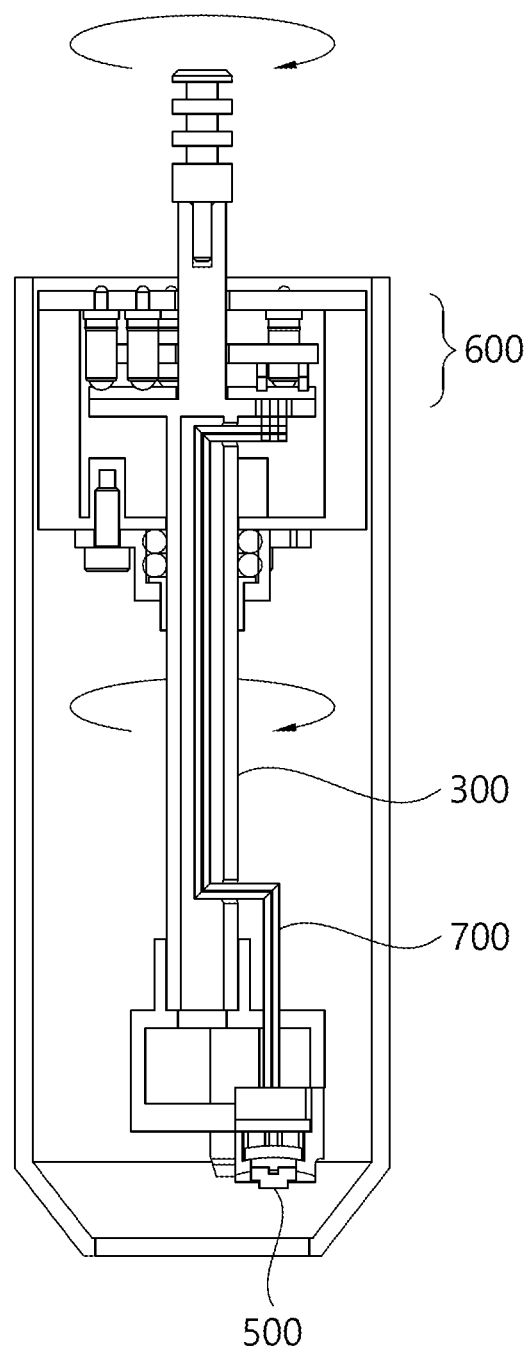

FIGS. 5a and 5b are operational views of a cartridge for the high intensity focused ultrasound generator apparatus according to the first embodiment of the present invention.

Referring to FIG. 5a, the transducer 500 may be coupled to the transducer 500 holder at a point spaced a predetermined distance away from the rotation center of the shaft 300. As described above, the wiring 700 that transmits power to operate the transducer 500 may be disposed in the upper space V1 and the lower space V2 through the shaft 300.

Referring to FIG. 5b, at least one transducer 500 may rotate together when external power is transmitted and the shaft 300 rotates. At this time, the wiring 700 that transmits power to the transducer 500 is provided through a channel of the shaft 300, and the upper and lower ends of the wiring 700 rotate together with the shaft 300. Even if the shaft 300 rotates, the rotating electrical connector 600 prevents the wiring 700 from being twisted, allowing the shaft 300 to rotate infinitely. The cartridge according to the present disclosure can fundamentally solve the problem of rotation angle limitation caused by the wiring 700 when changing the focusing position of ultrasound waves in a wide range while rotating the transducer 500. In addition, since the channel where the wiring 700 is arranged and the connection portion between the shaft 300 and the frame are each sealed, stable operation is possible while preventing leakage of the fluid contained in the cartridge.

Figure 6A:
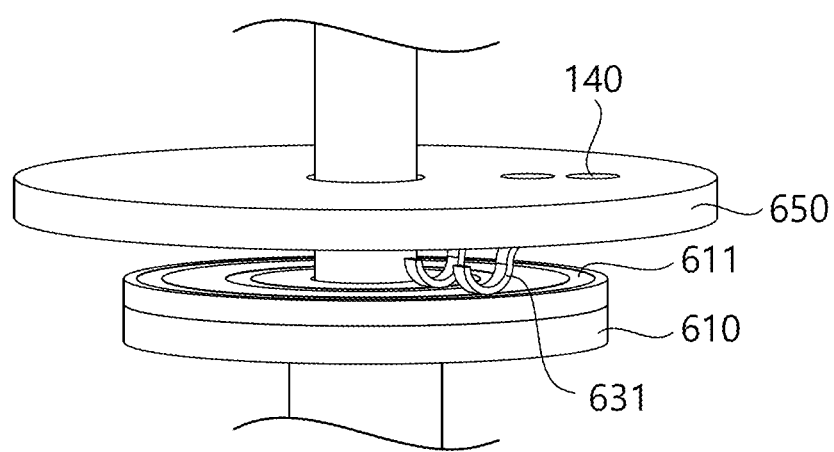
FIGS. 6*a*, 6*b*, and 6*c* are sectional views showing variations of the rotary electrical connector in the first embodiment.
Figure 6B:
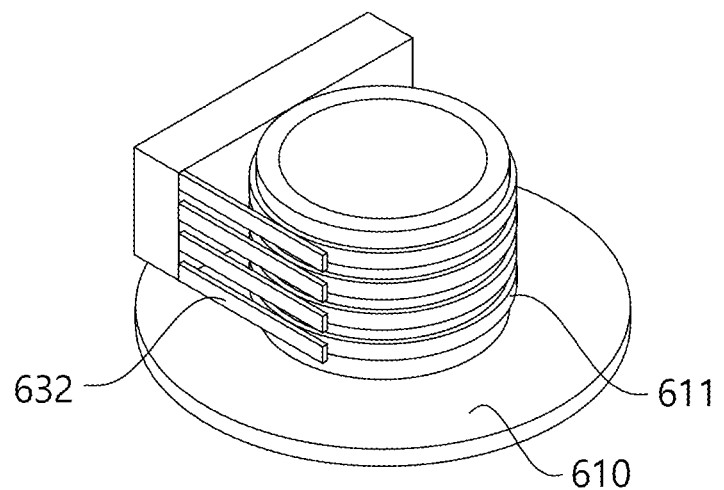
Figure 6C:
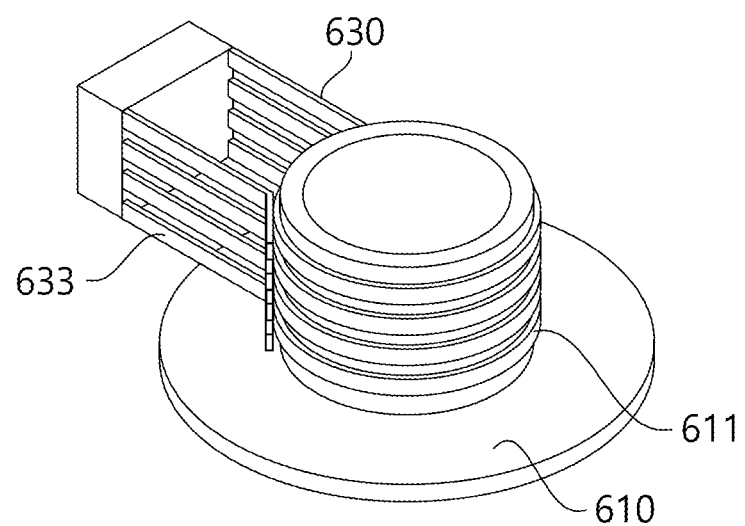

FIGS. 6a, 6b, and 6c are sectional views showing variations of the rotary electrical connector in the first embodiment.

Referring to FIG. 6a, in the present disclosure, unlike the rotary electric connector of the first embodiment, the pogo pin may be omitted, and the elastic part 631 may function as a contact portion. A plurality of elastic part 631 may be provided on the lower side of the second disk 620 according to the spacing of the plurality of ring-shaped conductors 611 provided on the first disk 610. Each elastic part 631 may be electrically connected to the connector 140 exposed on the upper surface of the second disk 620.

Referring to FIG. 6b, the annular conductor of the rotary electrical connector in the present disclosure may be modified to a configuration in which it is disposed radially on the first disk 610. One side of the first disk 610 extends to a predetermined length along the extension direction of the shaft, and a plurality of ring-shaped conductors 611 may be provided on the extended side. The plurality of contact pins 632 may be spaced apart along the extending direction of the shaft according to the spacing of the ring-shaped conductors 611. In this modified example as well, when the first disk 610 rotates infinitely, the plurality of contact pins 632 slide on the ring-shaped conductor 611 to maintain electrical contact. Therefore, stable operation is possible even if the transducer rotates infinitely.

Referring to FIG. 6c, the rotary electrical connector may be modified into a configuration wherein contact portions 633 are arranged in two rows, with each contact portion 633 making contact on the side of the ring-shaped conductor 611 provided on the first disk 610.

Figure 7:
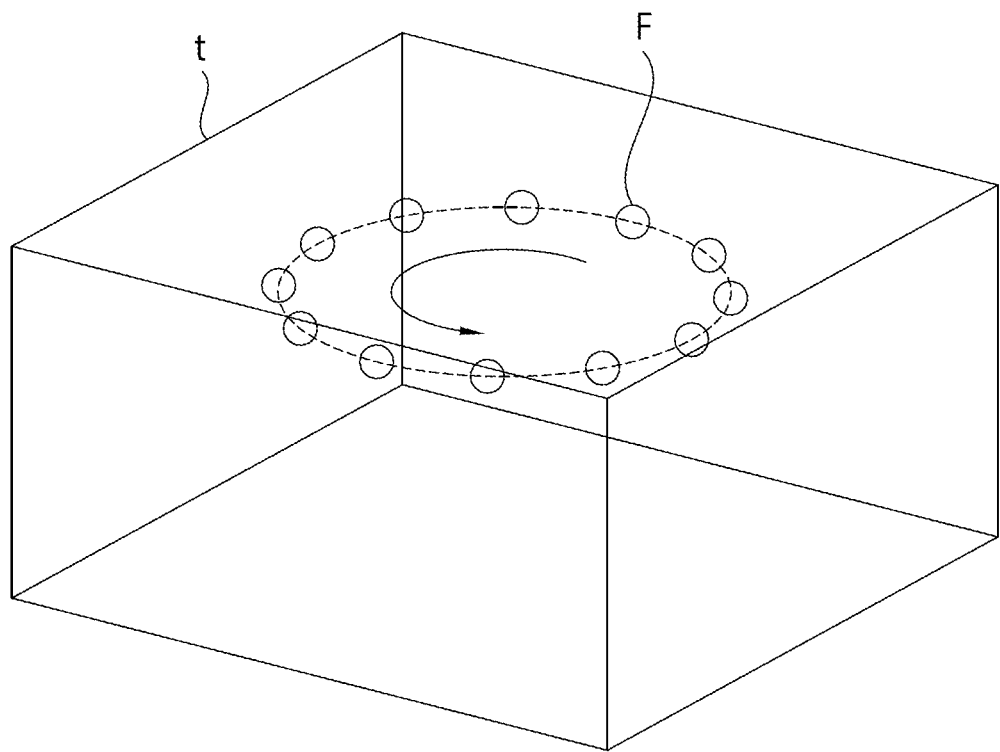
FIG. 7 is a conceptual diagram illustrating the focal positions of ultrasound waves during operation of the cartridge for the high intensity focused ultrasound generator apparatus according to the first embodiment of the present invention.

FIG. 7 is a conceptual diagram illustrating the focal positions of ultrasound waves during operation of the cartridge for the high intensity focused ultrasound generator apparatus according to the first embodiment of the present invention.

Referring to FIG. 7, when the cartridge according to the present disclosure is operated, the focus F at which ultrasound waves generated from one transducer are focused within the tissue t may move along a circular path. At this time, the interval between the focusing positions of the ultrasound waves can be adjusted by adjusting the operating timing by a control unit. At the focus (F) where each ultrasound is focused, energy is concentrated and the cells can be heated and treated. In one embodiment, at the focus of ultrasound, cells may cause denaturation called coagulation, and the tissue may then be restored through natural tissue recovery. Furthermore, in this specification, treatment refers to exerting effects of that improve Wrinkles, Tone and Textural Changes, Scars and Acne Scarring, Sagging mucosa, Overall Rejuvenation, Hyperhidrosis, laxity, lifting, tightening, fat reduction, etc., by locally heating skin tissue.

In general treatment, the energy transmitting area of the cartridge is smaller than the total treatment area of the skin, so the user performs treatment multiple times while changing the position of the cartridge. These repetitive tasks increase treatment time and increase user fatigue. Therefore, it is advantageous to treat many areas with the cartridge attached to the skin once. In the present disclosure, the transducer in the cartridge is rotated to treat a wide area, and the transducer can be configured to treat tissue t while rotating infinitely.

Hereinafter, a cartridge for a focused ultrasound generator according to a second embodiment of the present invention will be described with reference to FIGS. 8 and 9. The following embodiment may also include the same configuration as the first embodiment described above, and description of the same configuration will be omitted and differing configurations will be described.

Figure 8:
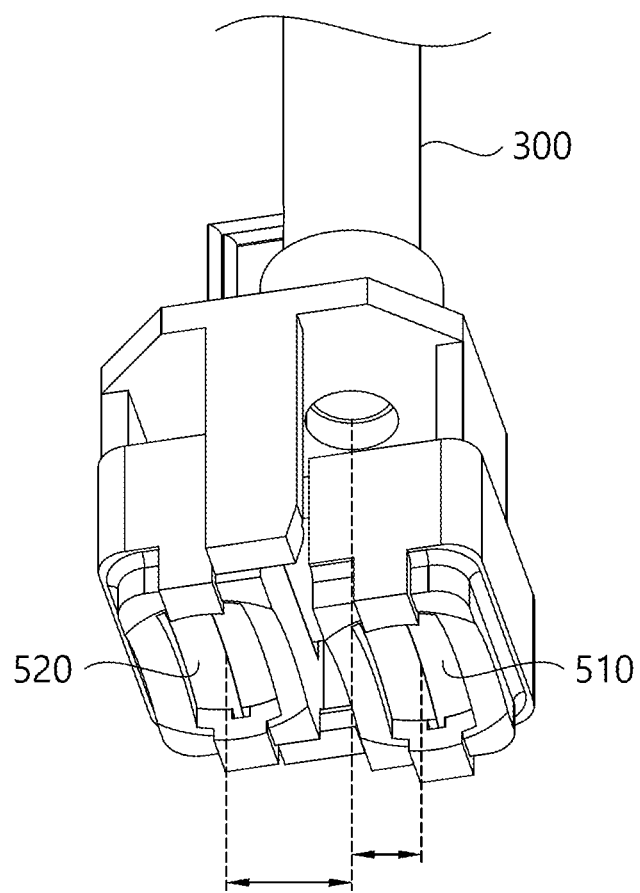
FIG. 8 is an enlarged partial sectional view of a cartridge for the high intensity focused ultrasound generator apparatus according to the second embodiment of the present invention.
Figure 9:
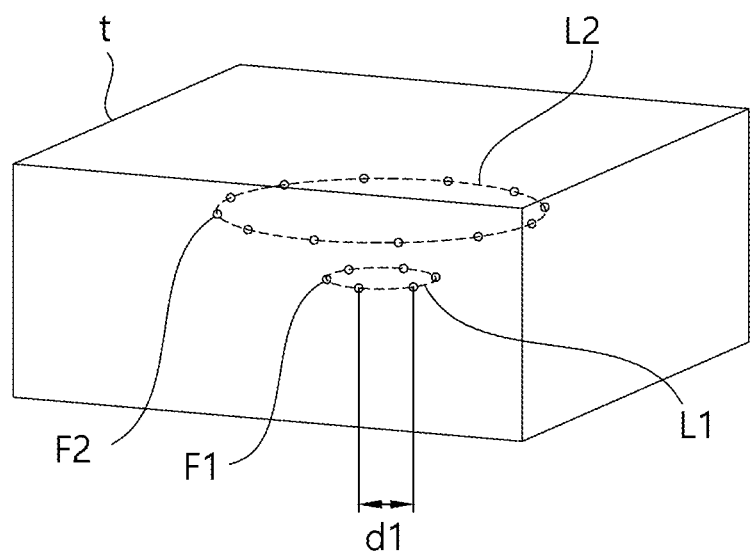
FIG. 9 is a conceptual diagram illustrating the focal positions of ultrasound waves during operation of a cartridge for the high intensity focused ultrasound generator apparatus according to the second embodiment of the present invention.

FIG. 8 is an enlarged partial sectional view of a cartridge for the high intensity focused ultrasound generator apparatus according to the second embodiment of the present invention, and FIG. 9 is a conceptual diagram illustrating the focal positions of ultrasound waves during operation of a cartridge for the high intensity focused ultrasound generator apparatus according to the second embodiment of the present invention.

Referring to FIGS. 8 and 9, the cartridge for a focused ultrasound generator according to the second embodiment of the present invention may be comprised of two ultrasound transducers 510 and 520. The first transducer 510 and the second transducer 520 are provided adjacent to each other, and may be configured to have different rotation radii as the shaft 300 rotates. Additionally, the first transducer 510 and the second transducer 520 may be installed in different vertical positions.

According to this embodiment, as the shaft rotates and the ultrasound transducers operate, the first focal point (F1) generated by the first transducer (510) and its corresponding circular path (L1) may differ from the second focal point (F2) generated by the second transducer (520) and its associated circular path (L2). The movement paths of the first focus (F1) and the second focus (F2) are concentric but may have different radii. Additionally, the depth within the tissue of the first focus (F1) and the second focus (F2) may vary due to the difference between the vertical installation position of the first transducer (510) and the vertical installation position of the second transducer (520).

The first transducer 510 and the second transducer 520 can operate independently, and the operation of any one transducer can be selected by the control unit. When the shaft rotates, the first transducer 510 and the second transducer 520 can be controlled together, and the operating timing can be adjusted differently in consideration of the linear speed generated according to the difference in rotation radius. As an example, a second transducer with a large rotation radius can make the ultrasound generation interval shorter than that of the second transducer. Therefore, within the tissue, the distance d1 between the first foci may be similar to the distance d2 between the second foci.

As described above, when using the cartridge according to the present disclosure, three-dimensional treatment of tissue is possible by controlling the operation of a plurality of transducers and generating ultrasound while rotating.

Figure 10:
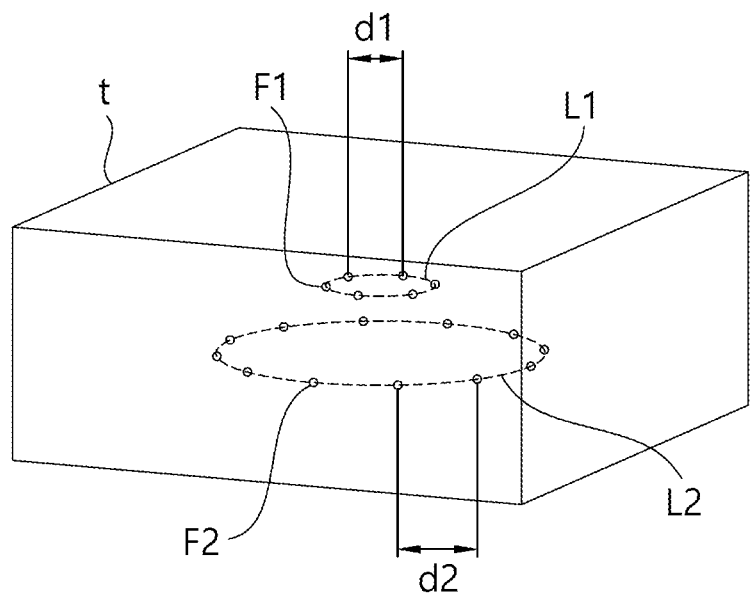
FIG. 10 is a drawing illustrating the focal points and movement paths of ultrasound within tissues in a modified example of the second embodiment of the present invention.

FIG. 10 is a drawing illustrating the focal points and movement paths of ultrasound within tissues in a modified example of the second embodiment of the present invention.

Referring to FIG. 10, in the second embodiment of the present invention, the configuration of the cartridge may be modified so that the path along which the focus moves may appear at different depths.

Meanwhile, although not shown, in a modified example of this embodiment, the transducers in the cartridge are composed of a pair, and the first transducer and the second transducer can be configured to rotate around the rotation axis of the shaft. The first transducer may have a smaller rotation radius than the second transducer. The focus of the first transducer may appear at a shallower depth within the tissue than that of the second transducer. That is, within the tissue, the first focus (F1) can be moved along a circular path (L1) with a small radius at a shallow depth from the surface, and the second focus (F2) can be moved along a circular path (L2) with a large radius at a greater depth from the surface. When the movement path and depth of the focal points are determined in this way, unlike the previous embodiment, ultrasound energy can be delivered to a wider area deep in the tissue. In addition, damage to tissues adjacent to the surface can be prevented by reducing the energy transfer area to tissues adjacent to the surface (shallow tissues). In addition, in this embodiment, in order to perform uniform treatment on the treatment area as shown in FIG. 9, the operation cycle of each transducer can be decided so that the spacing (d1) of the first focus and the spacing (d2) of the second focus are similar.

Hereinafter, with reference to FIGS. 11a and 11b, a cartridge control device according to a third embodiment of the present invention will be described.

Figure 11A:
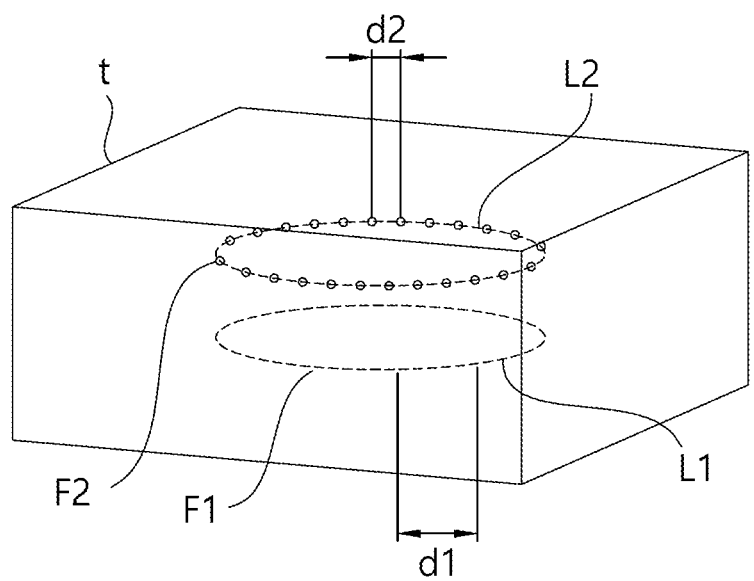
FIGS. 11*a* and 11*b* are diagrams illustrating the focal points within tissues when the transducer is independently controlled according to the third embodiment of the present invention.
Figure 11B:
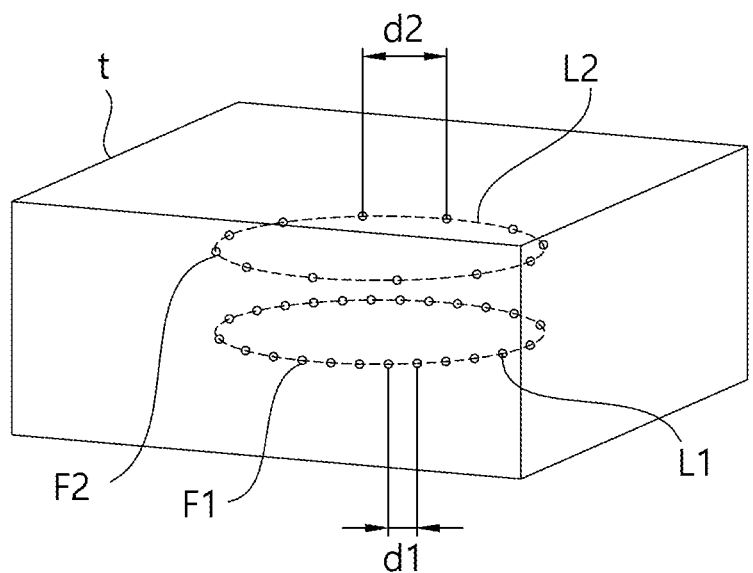

FIGS. 11a and 11b are diagrams illustrating the focal points within tissues when the transducer is independently controlled according to the third embodiment of the present invention.

Although not shown, in this embodiment, the control device may adjust the generation cycle of the first focus and/or the generation cycle of the second focus according to the user's selection or a pre-entered algorithm. When the generation cycle of the transducer's foci is individually adjusted by the control device, the number and spacing of the foci can be adjusted. Additionally, the control device can control the operating cycle of each ultrasound transducer based on the rotation speed of the shaft. As an example, when the rotation speed of the shaft is quickly controlled, the operating cycle of the transducer can be shortened. Conversely, if the rotation speed of the shaft is controlled slowly, the operating cycle of the transducer can be adjusted to be long. As an example, such a control device may be provided in the main body or in a handpiece.

Meanwhile, for the purpose of facilitating explanation, the following discussion will assume the use of cartridges with the first and second transducers having the same rotational radius. Therefore, the radii (L1, L2) of the circular paths along which the focus generated by each transducer moves are the same, even though at different depths within the tissue. However, the configuration of this cartridge is only shown to aid understanding, and the transducers in the cartridge may be composed of three or more, or may be configured to have different rotation radii and different penetration depths.

Referring to FIG. 11a, when the ultrasound generator is operated, the spacing d1 between the first focal points of the first transducer may be farther than the spacing d2 between the second focal points of the second transducer. In other words, the distance d2 between the second foci of the second transducer may be closer than the distance d1 between the first foci of the first transducer. Individual control of such transducers can provide treatment differently depending on the depth within the tissue. As an example, treatment may be performed intensively on tissue at a depth close to the surface, and relatively weak treatment may be performed on areas deeper than that.

Referring to FIG. 11b, contrary to FIG. 11a, the spacing (d1) of the first foci by the first transducer within the tissue (t) is smaller than the spacing (d2) of the second foci by the second transducer. Under the control of the control unit, the operation cycle of the first transducer can be set to be shorter than the operation cycle of the second transducer.

Such control of the generation cycle of an ultrasound transducer can improve responsiveness to the size and depth of the lesion that is the target of treatment.

Hereinafter, a cartridge for a focused ultrasound generator according to a third embodiment of the present invention will be described with reference to FIGS. 12 to 13b.

Figure 12:
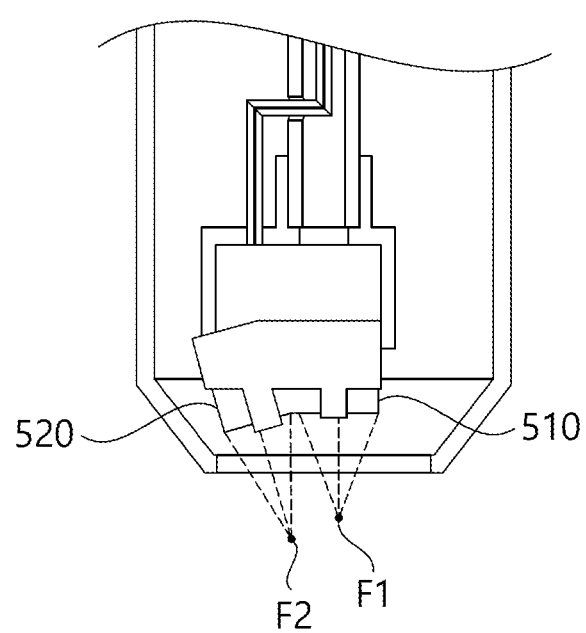
FIG. 12 is a cross-sectional view of a cartridge for the high intensity focused ultrasound generator apparatus according to the fourth embodiment of the present invention.

FIG. 12 is a cross-sectional view of a cartridge for the high intensity focused ultrasound generator apparatus according to the fourth embodiment of the present invention.

Referring to FIG. 12, the cartridge for a focused ultrasound generator according to the third embodiment of the present invention is provided with a pair of transducers. One transducer 520 is provided to be tilted respect to the central axis of rotation. The focus F1 generated by the first transducer 510 may be located vertically below the first transducer 510, and the focus F2 generated by the second transducer 520 may be positioned close to the focus (F1).

Figure 13A:
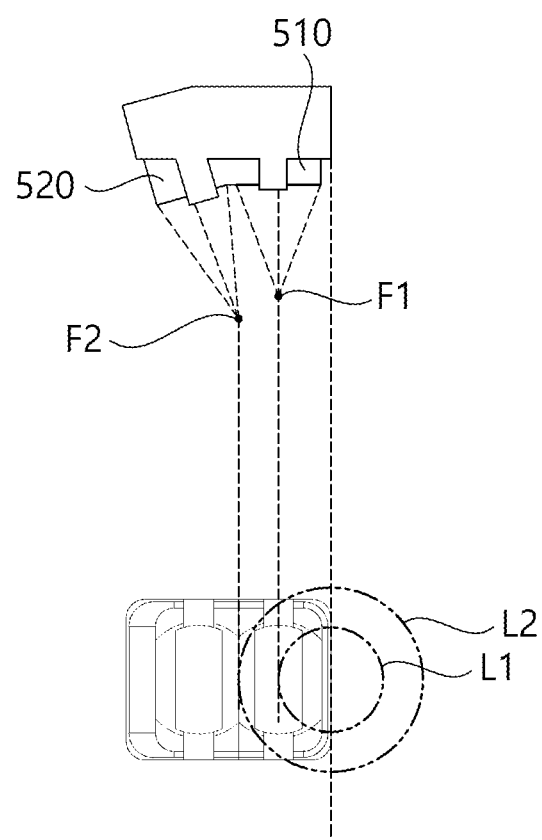
FIGS. 13*a* and 13*b* are conceptual diagrams illustrating the focal positions of ultrasound waves during operation of a cartridge for the high intensity focused ultrasound generator apparatus according to the fourth embodiment of the present invention.
Figure 13B:
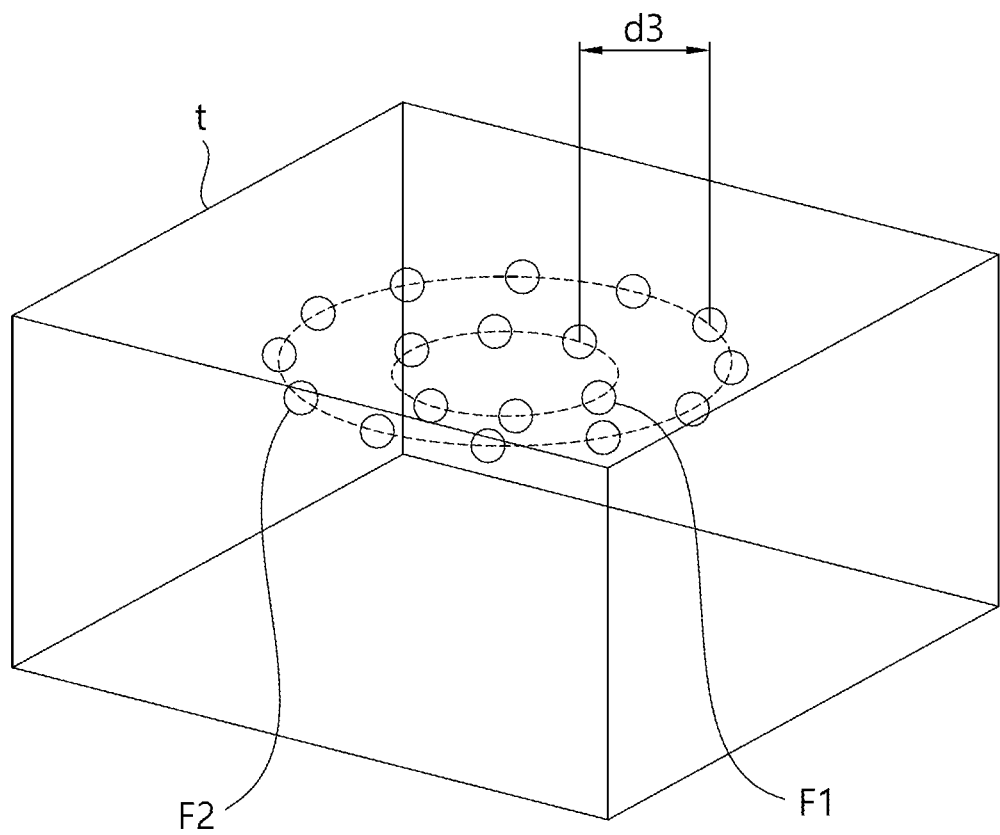

FIGS. 13a and 13b are conceptual diagrams illustrating the focal positions of ultrasound waves during operation of a cartridge for the high intensity focused ultrasound generator apparatus according to the fourth embodiment of the present invention.

Referring to FIG. 13a, in the same embodiment as the above-described embodiment, a pair of transducers rotate together by rotation of the shaft, and the focus of the ultrasound waves generated from each ultrasound transducer can be moved along a circular path with different radii. Additionally, the location of the second focus (F2) generated from the tilted second transducer 520 may be adjacent to the first focus (F1) generated from the first transducer 510. Accordingly, the distance between the movement path L1 of the first focus and the movement path L2 of the second focus may be closer than in the second embodiment described above.

Each transducer must have a certain size to focus ultrasound waves. When a plurality of transducers are provided in a cartridge, the distance between each focus may inevitably depend on the size of the transducer. However, when one transducer is tilted as in this embodiment, the plane positions of the focal points can become closer, making intensive treatment of the tissue possible. Meanwhile, although not shown, if the second transducer 520 is disposed at an angle opposite to that shown in FIG. 10*a*, the rotation radius at which the second focus moves may increase.

Referring to FIG. 13*b*, when compared with the treatment area within the tissue (t) of the second embodiment shown in FIG. 9, the gap D3 between the paths along which the first focus F1 and the second focus F2 move in the fourth embodiment may be narrowed. In this embodiment, as the horizontal distance between focuses generated from each transducer becomes closer, the treatment area may be different from the previous embodiment. In addition, in this embodiment, a transducer that operates similarly to the above-described embodiment can be selected, so the treatment depth and treatment range can be adjusted.

Hereinafter, the focused ultrasound generator according to the fifth embodiment of the present invention will be described with reference to FIGS. 14 to 17*b*.

Figure 14:
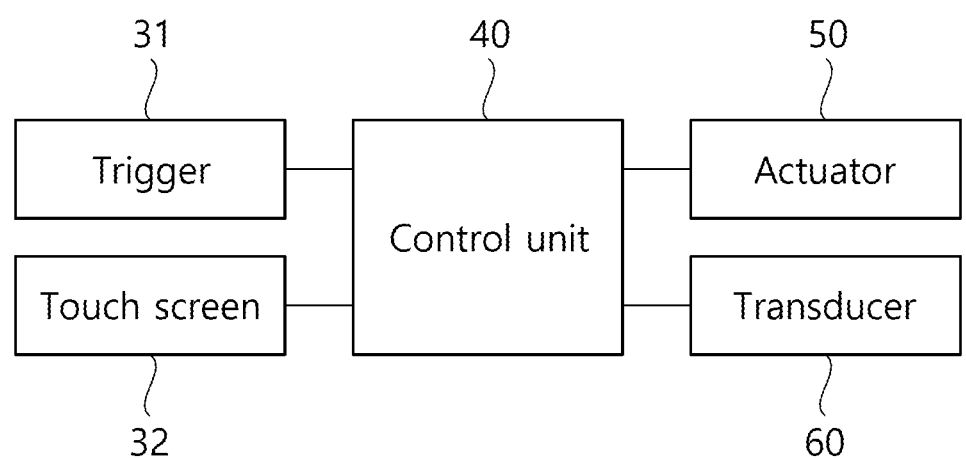
FIG. 14 is a block diagram illustrating the configuration of the high intensity focused ultrasound generator apparatus according to the fifth embodiment of the present invention.

FIG. 14 is a block diagram illustrating the configuration of the high intensity focused ultrasound generator apparatus according to the fifth embodiment of the present invention.

Referring to FIG. 14, the focused ultrasound generator according to the fifth embodiment of the present invention may comprise a trigger 31, a touch screen 32, a control unit 40, a driving unit 50, and a transducer 60.

The trigger 31 functions as an input unit for operating the transducer 60. As an example, the trigger 31 may be provided on one side of the handpiece. The touch screen 32 may be configured to display information related to the operation of the focused ultrasound generator. Additionally, the touch screen 32 may be configured to perform a user's touch input. As an example, the touch screen 32 may be provided on one side of the handpiece opposite to the trigger 31.

The control unit 40 may be configured to generate a control input that drives the transducer 60 and/or the actuator 50 according to the user's input. The control unit 40 may generate a control input to drive the transducer 60 and/or the actuator 50 when a signal is generated by the trigger 31. Additionally, the control unit 40 may distinguish inputs from the touch screen 32 and generate control inputs that drive the transducer 60 and/or the actuator 50.

The driving unit 50 may be provided with a widely used motor. The power generated by the motor may rotate the ultrasound transducer 60 or perform linear reciprocating movement by a power transmission mechanism.

As an example, the control unit 40 may perform control by distinguishing between cases where an input is received by the touch screen 32 for a predetermined time or less and a case where an input is received by the touch screen 32 for a predetermined time or more. In this case, when a touch input ("short touch") of less than a predetermined time is received, the control unit 40 can switch the information displayed on the screen based on the coordinates on the screen 32 where the touch was input. Conversely, the control unit 40 may generate a control input to perform the same function as the trigger 31 when a touch input ("long touch") is received for a predetermined period of time or longer. That is, when the control unit 40 receives a touch input for a predetermined period of time or longer, a control input for operating the transducer 60 and/or the actuator 50 can be generated.

The driving unit 50 is provided in the handpiece and is configured to generate power to rotate the transducer 60 in the cartridge.

The transducer 60 may be configured to generate ultrasound waves by a control input from the control unit 40.

Meanwhile, although not shown, this embodiment may be configured by omitting the rotation drive unit 50 for rotating the ultrasound transducer 60. In this case, the control unit 40 can generate control signal to operate the transducer 60.

Figure 15:
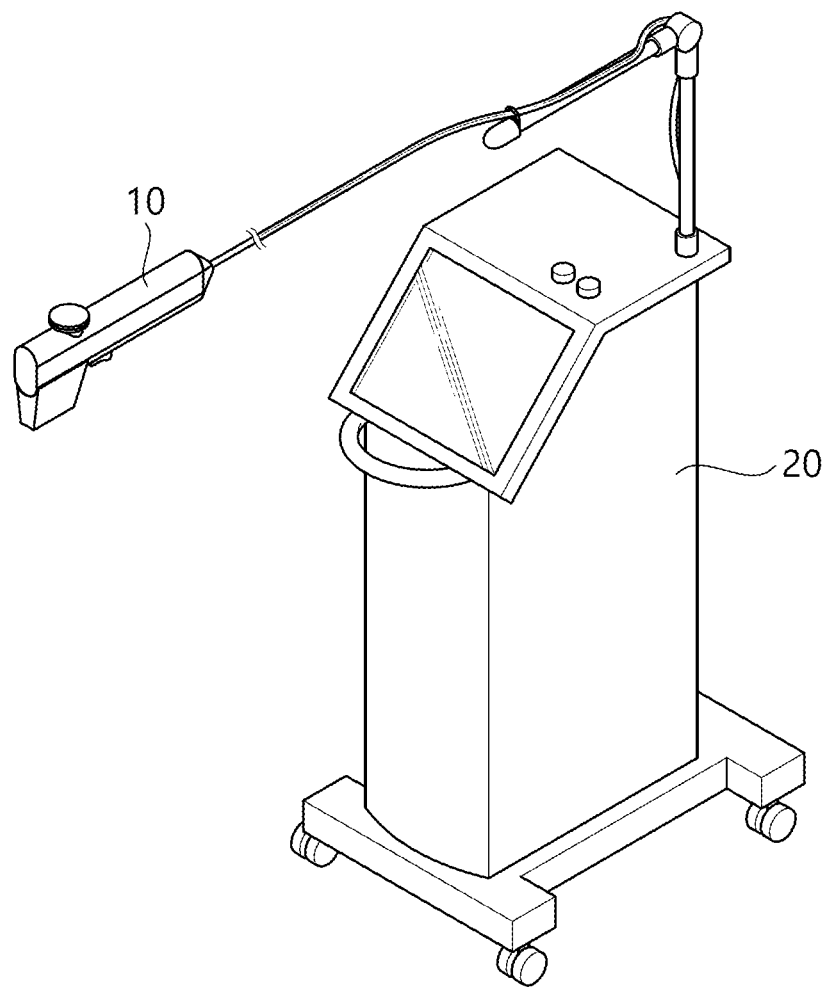
FIG. 15 is a perspective view of the high intensity focused ultrasound generator apparatus according to the fifth embodiment of the present invention.

FIG. 15 is a perspective view of the high intensity focused ultrasound generator apparatus according to the fifth embodiment of the present invention.

Referring to FIG. 15, the focused ultrasound generator according to the fifth embodiment of the present invention may include a handpiece and a main body.

In the fifth embodiment, the handpiece 10 is configured so that the user can hold and use it, and a cartridge can be coupled to one end. In this embodiment, the cartridge may include the cartridges of the first to third embodiments described above. Additionally, this embodiment may include a control unit that performs the control method of the fourth embodiment. As described above, a transducer for generating ultrasound waves may be provided inside the cartridge. Additionally, the handpiece 10 may be provided with a driving unit and a power transmission mechanism for moving the transducer. As an example, the power transmission mechanism may be a worm gear, a bevel gear, a rack and gear, etc.

The main body 20 may be equipped with various components for operating the ultrasound transducer, such as a power supply unit, a control unit, and a screen. However, this main body configuration can be a widely used configuration.

Figure 16:
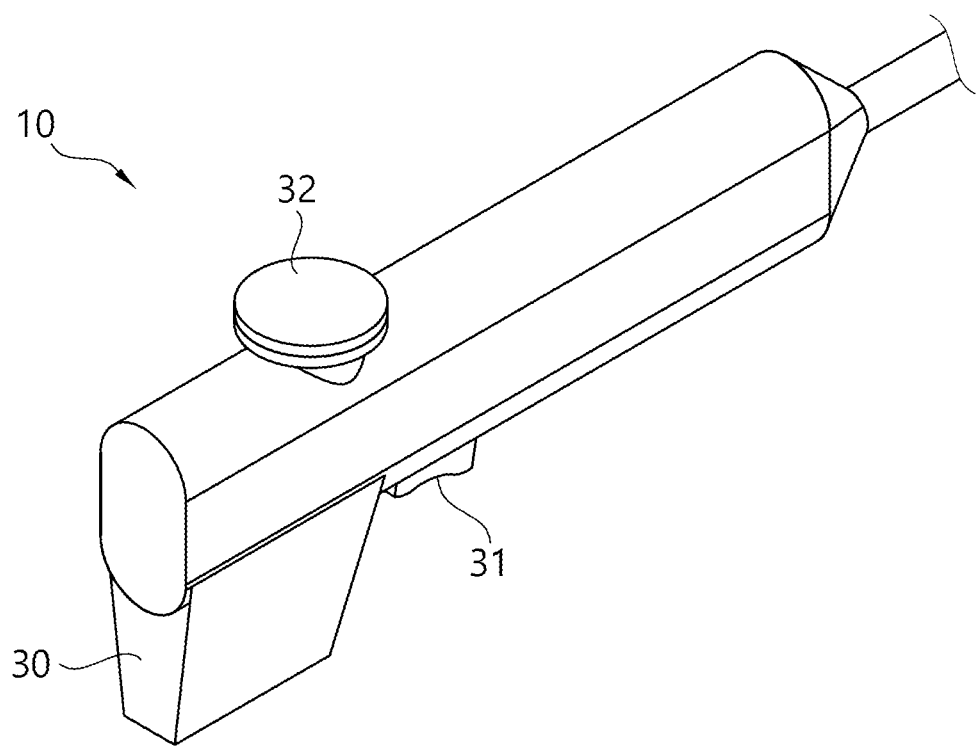
FIG. 16 is a magnified view of the handpiece in the fifth embodiment.

FIG. 16 is a magnified view of the handpiece in the fifth embodiment.

Referring to FIG. 16, the handpiece 10 may be provided with a trigger 31 and a touch screen 32 as input units. As an example, the trigger 31 may be ergonomically configured to be operated by pulling it with an index finger when held by a user. Meanwhile, the touch screen 32 may be provided on one side of the handpiece 10 in a direction opposite to the direction in which the trigger 31 is provided. As the cartridge 30 is provided in one direction of the handpiece, there are certain restrictions on the user's ability to hold and use the handpiece.

The user mainly operates the transducer using the trigger (31) while holding the handpiece (10). When the object transmitting ultrasound waves is formed three-dimensionally, for example, when transmitting ultrasound waves to facial skin, it is necessary to attach it at various angles. At this time, depending on the angle at which the handpiece 10 is closely attached, it may be inconvenient for the user to operate the trigger 31. In this case, the user may use a 'long touch' on the touch screen 32 instead of the trigger 31 to control the transducer. can operate. That is, depending on the angle of the handpiece 10, the user can generate an operating signal of the transducer using the trigger 31 or the touch screen 32. In this case, without providing a separate trigger 31 for the user's convenience, the touch input of the touch screen 32 is differentiated and the same function as if there are two triggers 31 is achieved.

Figure 17A:
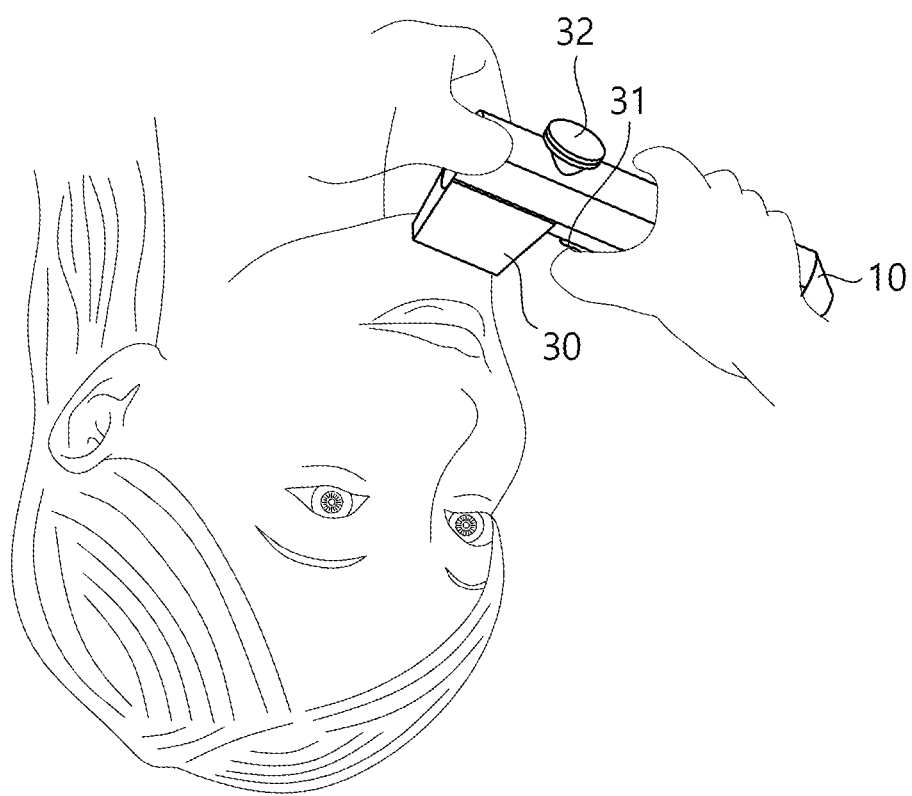
FIGS. 17*a* and 17*b* show the operational states of the handpiece in the fifth embodiment
Figure 17B:
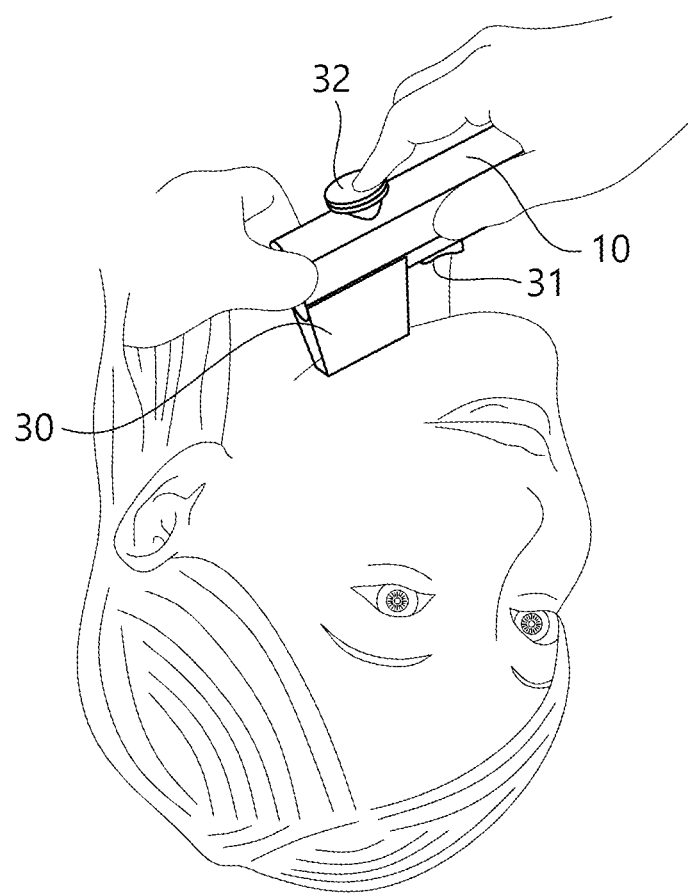

FIGS. 17*a* and 17*b* show the operational states of the handpiece in the fifth embodiment FIGS. 17*a* and 17*b* show a usage state based on the user's field of view during facial treatment. When treating the face using the above-mentioned focused ultrasound generator, the user can perform the treatment while positioned next to the head of the patient lying down.

At this time, as shown in FIG. 17a, the transducer can be operated by holding the handpiece 10 and pressing the trigger 31. In addition, when the position of the handpiece is changed and brought into close contact as shown in FIG. 17b, the handpiece 10 may be placed at an angle that makes it difficult to operate the trigger 31 or is uncomfortable due to the angle of the hand or contact with the patient's face. there is. At this time, the user can operate the transducer by using the touch screen 32 as an auxiliary control. Specifically, instead of using the trigger 31, the user can perform a 'long touch' input on the touch screen 32. The control unit processes the 'long touch' input from the touch screen 32 in the same manner as the trigger 31 operation signal to operate the transducer.

As described above, in this embodiment, the user mainly uses a trigger to operate the focused ultrasound, but in some cases, a touch screen that can be used auxiliary is provided, which has the effect of maximizing user convenience.

What is claimed is:

1. A cartridge for high intensity focused ultrasound generator apparatus comprising:
    a cartridge housing defining an internal space configured with an upper portion to be detachably coupled with a handpiece and a lower portion with an acoustic window for transmitting ultrasound waves;
    a frame configured to divide the internal space into an upper space and a lower space;
    a shaft penetrating the upper portion of the cartridge housing and the frame in a vertical direction and configured to be rotatable;
    at least one transducer provided in the lower space and configured to rotate together with the shaft; and
    a rotating electrical connector configured to maintain electrical connection when the at least one transducer rotates,
    wherein the at least one transducer is configured to generate a focal point at a predetermined point in a radial direction from a rotation center of the shaft,
    wherein the at least one transducer is formed of a plurality of transducers, and the plurality of transducers are configured to generate focal points with different radiuses of rotation. the focal points including first and second focal points and
    wherein the second focal point with a deeper tissue penetration depth follows a larger circular path compared to the first focal point with a shallower tissue penetration depth.

2. The cartridge for high intensity focused ultrasound generator apparatus according to claim 1, wherein the focal points of the plurality of transducers have different distances from a bottom of the acoustic window.

3. The cartridge for high intensity focused ultrasound generator apparatus according to claim 2, wherein at least one of the plurality of transducers is tilted with respect to the shaft.

4. The cartridge for high intensity focused ultrasound generator apparatus according to claim 1, wherein at least one of the plurality of transducer is configured to operate independently.

5. A high intensity focused ultrasound generator apparatus comprising:
    a handpiece configured to be held by a user and equipped with a trigger and a touch screen;
    a control unit that controls an operation of at least one transducer based on the trigger and input generated from the touch screen; and
    a cartridge configured to be coupled to an end of the handpiece,
    wherein the cartridge is configured to comprise a rotating electrical connector configured to remain electrically connected when the at least one transducer rotates,
    wherein the control unit is configured to distinguish between short touch and long touch inputs received from the touch screen, and configured to control the transducer in the same manner as input from the trigger when the long touch is input.

6. The high intensity focused ultrasound generator apparatus according to claim 5, wherein the trigger is provided on one side of the handpiece,
    wherein the touch screen is provided on a side of the handpiece opposite to the trigger.

7. The high intensity focused ultrasound generator apparatus according to claim 6, wherein the at least one transducer is formed of a plurality of transducers, with focal points of ultrasound waves being arranged to move along circles with different radiuses.

8. The high intensity focused ultrasound generator apparatus according to claim 7,
    wherein at least one of the plurality of transducers is configured to have a different distance of focal point from a bottom of the cartridge than the other transducers.

9. The high intensity focused ultrasound generator apparatus according to claim 8,
    wherein at least one of the plurality of transducers is provided at a predetermined angle with the other transducers.

10. The high intensity focused ultrasound generator apparatus according to claim 9, wherein the control unit is configured to selectively operate at least one of the plurality of transducers to adjust the radius and/or depth of the focal point according to the input by user.

* * * * *